United States Patent
Tsang et al.

(10) Patent No.: US 11,689,482 B2
(45) Date of Patent: Jun. 27, 2023

(54) DYNAMICALLY GENERATING A TYPING FEEDBACK INDICATOR FOR RECIPIENT TO PROVIDE CONTEXT OF MESSAGE TO BE RECEIVED BY RECIPIENT

(71) Applicant: International Business Machines Corporation, Armonk, NY (US)

(72) Inventors: Nicholas Tsang, Saratoga, CA (US); Michael McCawley, Groton, MA (US); Dong Zhang, Durham, NC (US); Haoyang Li, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 76 days.

(21) Appl. No.: 17/523,139

(22) Filed: Nov. 10, 2021

(65) Prior Publication Data

US 2023/0147542 A1    May 11, 2023

(51) Int. Cl.
G06F 15/16 (2006.01)
H04L 51/02 (2022.01)
H04L 51/04 (2022.01)

(52) U.S. Cl.
CPC .............. H04L 51/02 (2013.01); H04L 51/04 (2013.01)

(58) Field of Classification Search
CPC ......... H04L 51/02; H04L 51/07; H04L 51/06; H04L 51/04
See application file for complete search history.

(56) References Cited

U.S. PATENT DOCUMENTS

| | | |
|---|---|---|
| 5,990,887 A | 11/1999 | Redpath et al. |
| 10,788,900 B1 | 9/2020 | Brendel et al. |
| 10,855,632 B2 | 12/2020 | Kennedy |
| 10,950,052 B1 | 3/2021 | Shirley et al. |
| 2013/0226561 A1 | 8/2013 | Park et al. |
| 2015/0193482 A1* | 7/2015 | Kaushansky ........... G06F 16/34 707/741 |
| 2020/0082592 A1 | 3/2020 | Gordon et al. |

OTHER PUBLICATIONS

Thelwall et al., "Sentiment Strength Detection in Short Informal Text," Journal of the American Society for Information Science and Technology, vol. 61, No. 12, 2010, pp. 2544-2558.
Oana Stefana Mitrea, "Understanding the Mobile Telephony Usage Patterns," Dissertation, Technische Universität Darmstadt, 2006, pp. 1-252.

* cited by examiner

*Primary Examiner* — John B Walsh
(74) *Attorney, Agent, or Firm* — Robert A. Voigt, Jr.; Shackelford, Bowen, McKinley & Norton, LLP

(57) ABSTRACT

A computer-implemented method, system and computer program product for dynamically providing a typing feedback indicator. Text entered in a body of a message that is to be sent to a recipient is detected. Prior to the user (author) sending the message to the recipient, the text of the message being composed by the user is analyzed to determine a sentiment and an emotion as well as to determine a topic of the content of the text. Based on such analyses, as well as possibly based on other criteria, a typing feedback indicator is generated to reflect an indication of the content of the message to be sent to the recipient. The typing feedback indicator may then be displayed on a computing device of the recipient while the user (author) is composing the message thereby providing the recipient context awareness of the message prior to receipt of such a message.

20 Claims, 6 Drawing Sheets

DYNAMICALLY GENERATING A TYPING FEEDBACK INDICATOR FOR RECIPIENT TO PROVIDE CONTEXT OF MESSAGE TO BE RECEIVED BY RECIPIENT

TECHNICAL FIELD

The present disclosure relates generally to messaging applications, and more particularly to dynamically generating a typing feedback indicator for the recipient to provide context of the message to be received by the recipient.

BACKGROUND

Messaging applications (also referred to as instant messaging applications or chat applications) involve the use of instant messaging technology which is a type of online chat allowing real-time text transmission over the Internet or another computer network. Messages are typically transmitted between two or more parties, when each user inputs text and triggers a transmission to the recipient(s), who are all connected on a common network. It differs from email in that conversations over instant messaging happen in real-time (hence "instant"). Most modern messaging applications use push technology and also add other features, such as emojis (or graphical smileys), file transfer, chatbots, Voice over IP, or video chat capabilities.

SUMMARY

In one embodiment of the present disclosure, a computer-implemented method for dynamically providing a typing feedback indicator comprises detecting a user entering text in a body of a message that is to be sent to a recipient. The method further comprises analyzing the text to determine a sentiment and an emotion. The method additionally comprises analyzing the text to determine a topic of content of the text. Furthermore, the method comprises generating the typing feedback indicator to reflect an indication of content of the message to be sent to the recipient based on the topic of the content of the text, the sentiment and the emotion. Additionally, the method comprises displaying the generated typing feedback indicator on a computing device of the recipient while the user is composing the message.

Other forms of the embodiment of the computer-implemented method described above are in a system and in a computer program product.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which.

DETAILED DESCRIPTION

Figure 1:
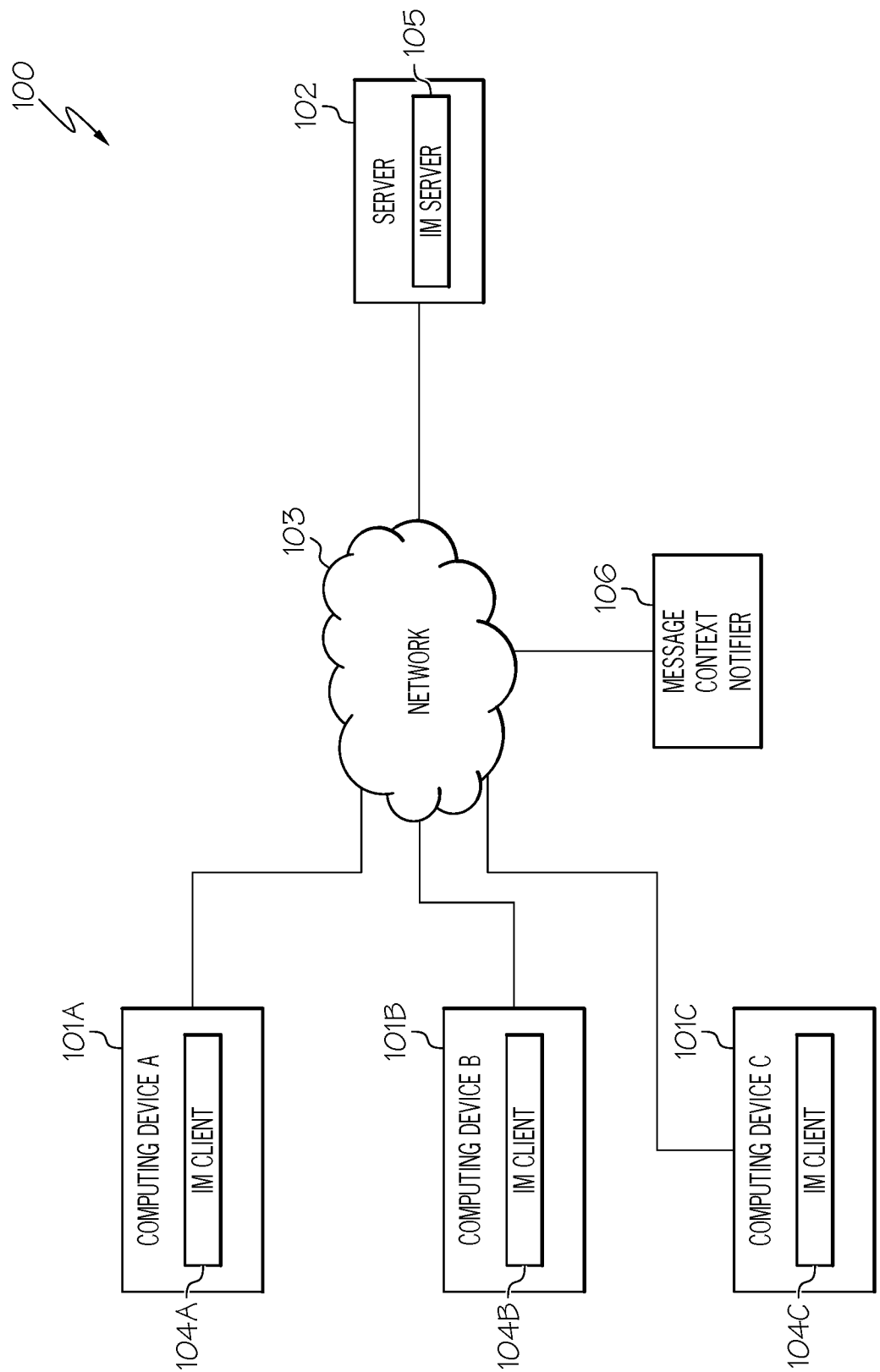
FIG. 1 illustrates a communication system for practicing the principles of the present disclosure in accordance with an embodiment of the present disclosure.

As stated in the Background section, messaging applications (also referred to as instant messaging applications or chat applications) involve the use of instant messaging technology which is a type of online chat allowing real-time text transmission over the Internet or another computer network. Messages are typically transmitted between two or more parties, when each user inputs text and triggers a transmission to the recipient(s), who are all connected on a common network. It differs from email in that conversations over instant messaging happen in real-time (hence "instant"). Most modern messaging applications use push technology and also add other features, such as emojis (or graphical smileys), file transfer, chatbots, Voice over IP, or video chat capabilities.

Another feature messaging applications may utilize is the typing feedback indicator. For example, when the user is typing a message, messaging applications may provide an indicator (referred to as the "typing feedback indicator") to the recipient(s) of the message which indicates that the user is typing a message. For instance, the recipient(s) may receive a typing feedback indicator that says "user is typing" after the user enters text in a message but prior to the user (author) actually sending the message to the recipient(s). As a result, the recipient(s) are provided some awareness that a message is coming or "in-flight."

While providing recipient(s) an awareness that a message is coming is helpful, such recipient(s) do not have an indication as to what is the subject matter of the incoming message. That is, the recipient(s) do not have any awareness as to the context of the incoming message.

The embodiments of the present disclosure provide a means for generating a typing feedback indicator for the recipient which provides context awareness of the message to be received by the recipient.

In some embodiments of the present disclosure, the present disclosure comprises a computer-implemented method, system and computer program product for dynamically providing a typing feedback indicator. In one embodiment of the present disclosure, text entered in a body of a message that is to be sent to a recipient is detected. For example, text being entered by a user (author) in a message of a messaging application (e.g., WhatsApp®) is detected, such as by detecting a keypress event. Prior to the user (author) sending the message to the recipient, the text of the message being composed by the user is analyzed to determine a sentiment and an emotion as well as to determine a topic of the content of the text. A "sentiment," as used herein, refers to a view of or attitude toward a situation or event. An "emotion," as used herein, refers to an instinctive or intuitive feeling. A "topic," as used herein, refers to a high-level concept that is the subject of the text entered by the author in the body of the message that is to be sent to the recipient. Based on such analyses, as well as possibly based on other criteria, such as based on the identified relationship between the author and the recipient(s), the identified event or situation occurring while the author is entering text in the body of the message, and the identified input mechanism the author is utilizing to enter text in the body of the message, a typing feedback indicator is generated to reflect an indication of the content of the message to be sent to the recipient. The typing feedback indicator includes words and/or a symbol(s) (e.g., icon shape), which may vary both in size and color. If the confidence that the typing feedback indicator correctly reflects the content of the message to be sent to the recipient(s), which may be reflected in a score, exceeds a threshold (e.g., threshold value), then the typing feedback indicator is displayed on a computing device of the recipient while the user (author) is composing the message. In this manner, recipients of a message may receive a typing feedback indicator that provides context awareness of a message being composed by an author prior to receipt of such a message.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill the relevant art.

Referring now to the Figures in detail, FIG. 1 illustrates an embodiment of the present disclosure of a communication system 100 for practicing the principles of the present disclosure. Communication system 100 includes computing devices 101A-101C (identified as "Computing Device A," "Computing Device B," and "Computing Device C," respectively, in FIG. 1) connected to a server 102 via a network 103. Computing devices 101A-101C may collectively or individually be referred to as computing devices 101 or computing device 101, respectively.

Computing device 101 may be any type of computing device (e.g., portable computing unit, Personal Digital Assistant (PDA), laptop computer, mobile device, tablet personal computer, smartphone, mobile phone, navigation device, gaming unit, desktop computer system, workstation, Internet appliance and the like) configured with the capability of connecting to network 103 and consequently communicating with other computing devices 101 and server 102. Computing device 101 may be configured to send and receive text-based messages in real-time, such as during an instant messaging session. Any user of computing devices 101 may be the creator or initiator of a message and any user of computing devices 101 may be a recipient of a message. It is noted that both computing devices 101 and the users of computing devices 101 may be identified with element number 101.

Network 103 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present disclosure.

In communication system 100, computing devices 101A-101C include a software agent, referred to herein as an Instant Messaging (IM) client 104A-104C, respectively. Instant messaging clients 104A-104C may collectively or individually be referred to as instant messaging clients 104 or instant messaging client 104, respectively. Furthermore, server 102 may include a software agent, referred to herein as the Instant Messaging (IM) server 105. IM client 104 provides the functionality to send and receive instant messages. As messages are received, IM client 104 may present the messages to the user in a dialog window (or IM window). Furthermore, IM client 104 provides the functionality for computing device 101 to connect to the IM server 105 which provides the functionality of distributing the instant messages to the IM clients 104 associated with each of the sharing users. "Instant messages," as used herein, include any one or more of the following: text, images, audio, video, etc.

Furthermore, system 100 includes what is referred to herein as the "message context notifier" 106 connected to network 103 by wire or wirelessly. In one embodiment, message context notifier 106 is configured to generate a typing feedback indicator for the intended recipient of a message (e.g., user of computing device 101B) that is currently being composed by an author (e.g., user of computing device 101A). A "recipient" of a message, as used herein, refers to the user that is intended to receive a message being composed by another user. An "author" of a message, as used herein, refers to the user that is entering text, such as via typing, in the body of a message that is to be transmitted to the recipient upon completion of composing the message. A "typing feedback indicator," as used herein, refers to a notification that is sent to the computing device of the intended recipient of a message currently being composed by a user (author). Such a notification may simply inform the intended recipient of a message (e.g., user of computing device 101B) that the user (author) (e.g., user of computing device 101A) is currently typing, such as a notification which states "user is typing." Alternatively, such a notification to the intended recipient of a message may provide context awareness of the message to be received by the intended recipient in the near future that is currently being composed by the user (author). Such context awareness enables the intended recipient to have context about what the incoming message will be about.

A description of the software components of message context notifier 106 used for generating a typing feedback indicator for the recipient(s) of a message that is currently being composed by an author is provided below in connection with FIG. 2. A description of the hardware configuration of message context notifier 106 is provided further below in connection with FIG. 3.

System 100 is not to be limited in scope to any one particular network architecture. System 100 may include any number of computing devices 101, servers 102, networks 103, IM clients 104, IM servers 105 and message context notifiers 106.

Figure 2:
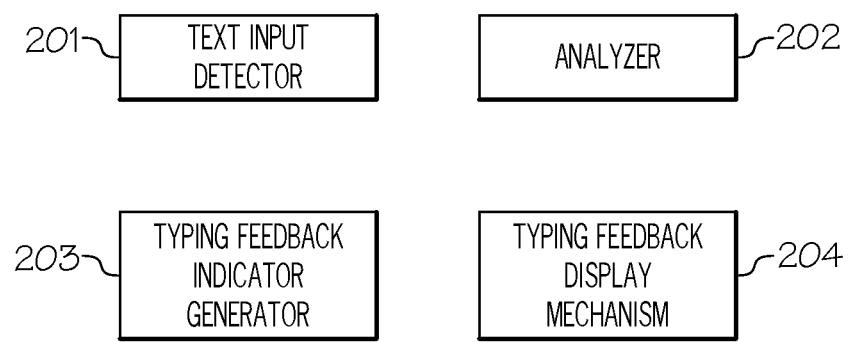
FIG. 2 is a diagram of the software components used by the message context notifier to generate a typing feedback indicator for the recipient(s) of a message that is currently being composed by the author in accordance with an embodiment of the present disclosure.

As stated above, FIG. 2 is a diagram of the software components used by message context notifier 106 (FIG. 1) to generate a typing feedback indicator for the recipient(s) of a message that is currently being composed by the author in accordance with an embodiment of the present disclosure.

Referring to FIG. 2, in conjunction with FIG. 1, message context notifier 106 includes text input detector 201 configured to detect a user (author, such as the user of computing device 101A) entering text in a body of a message that is to be sent to a recipient.

In one embodiment, text input detector 201 detects text being entered by a user (author) in a message of a messaging application (e.g., WhatsApp®), such as a message being composed in a chat box of a chat session (instant messaging session), by detecting a keypress event, such as when the user's cursor is located where the message is being composed. A "keypress event," as used herein, occurs when a key that produces a character value is pressed by the user (author, such as the user of computing device 101). Examples of keys that produce a character value include the alphabetic, numeric and punctuation keys. Alternatively, text input detector 201 detects text being entered by a user (author) in a message of a messaging application by detecting a keydown event, such as when the user's cursor is located where the message is being composed. A "keydown event," as used herein, occurs whenever any key is pressed by the user (author, such as the user of computing device 101) regardless as to whether the pressed key produces a character value.

Examples of software tools utilized by text input detector 201 to detect text being entered by a user in a message by detecting a keypress event or a keydown event include, but not limited to, BlackBox® Express, KidLogger, Iwantsoft Keylogger, Windows® Keylogger, REFOG Keylogger, Actual Keylogger, etc.

In one embodiment, text input detector 201 detects text being entered by a user (author) in a message of a messaging application based on detecting text appearing within a message box (field used to enter the text of the message) of the messaging application. In one embodiment, text input detector 201 assigns a method to the (change) attribute of the field (message box), where the attribute changes every time text is entered into the message box. Furthermore, in one embodiment, an event handler is assigned to the change attribute which may be programmed to provide a notification every time there is a change in the attribute (i.e., every time text is entered into the message box).

Message context notifier 106 further includes analyzer 202 configured to analyze the text entered by the user (author) in the message of the messaging application prior to the author actually sending the message to the recipient(s). For example, analyzer 202 may analyze the beginning of the message being composed by the user (author), such as a message being composed about a child's homework grade. For instance, the user (author) may enter the following text: "John got a D on his math" during the process of composing the complete message of "John got a D on his math assignment yesterday. This is the second D he got in math this week. I am so frustrated." The text of "John got a D on his math" may be analyzed by analyzer 202 prior to the user (author) completing the process of composing the message. In one embodiment, analyzer 202 continues to analyze the message as each character (e.g., alphabetic, numeric, punctuation) is entered by the user (author) in the body of the message that is to be sent to the recipient. By continuing to analyze the message as each character is entered by the author into the body of the message, the typing feedback indicator may be dynamically updated.

In one embodiment, such text is analyzed to determine a sentiment and an emotion. "Sentiment," as used herein, refers to a view of or attitude toward a situation or event. An "emotion," as used herein, refers to an instinctive or intuitive feeling.

In one embodiment, analyzer 202 analyzes the text entered in the body of the message as it is being composed by the author to determine a sentiment using a sentiment analysis tool (e.g., TensiStrength to detect the strength of stress and relaxation expressed in the text) to determine the author's view of or attitude toward a situation or event. "Sentiment analysis," as used herein, refers to the process of computationally identifying and categorizing opinions expressed in a piece of text, especially in order to determine whether the writer's attitude is positive, negative, or neutral. For example, analyzer 202 may detect the author's positive, negative or neutral sentiment expressed in the message based on identifying keywords associated with positivity (e.g., "good," "happy"), negativity (e.g., "frustrated," "upset") or neutrality (e.g., "don't care"). In one embodiment, such keywords associated with positivity, negativity or neutrality are stored in a data structure (e.g., table), where the data structure includes a listing of keywords and their associated sentiment. As a result, analyzer 202 performs a look-up in such a data structure using natural language processing for terms that match the text being entered by the author. In one embodiment, such a data structure is populated by an expert. In one embodiment, such a data structure is stored in a storage device (e.g., memory, disk unit) of message context notifier 106.

In one embodiment, analyzer 202 analyzes the text to detect emotion terms using IBM® Watson Tone Analyzer. The emotion terms are categorized as anger, disgust, fear, joy and sadness.

In one embodiment, emotions may be recognized from the text entered by the author using the keyword spotting technique by analyzer 202. In such a technique, text is converted into tokens, and from these tokens, emotion words are identified and detected. Initially, this technique will take some text as input and in the next step tokenization is performed to the input text. Words related to emotions will be identified in the next step. Afterwards, analysis of the intensity of emotion words will be performed. An emotion class may then be found as the required output.

In another embodiment, emotions may be recognized by analyzer 202 from the text entered by the author using the lexical affinity method. In such a technique, it assigns a probability affinity for a particular emotion to arbitrary words apart from picking up emotional keywords.

In another embodiment, emotions may be recognized by analyzer 202 from the text entered by the author using learning-based methods. In such a technique, the problem is defined to classify the input texts into different emotions. Unlike keyword-based detection methods, learning-based methods try to detect emotions based on a previously trained classifier, which applies machine learning, such as support vector machines and conditional random fields, to determine which emotion category the input text should belong.

In one embodiment, emotions may be recognized by analyzer 202 from the text entered by the author using an ontology. For example, an emotion ontology may be utilized which includes a class and subclass relationship format. Emotion classes at the primary level in the hierarchy are at the top of the ontology and emotion classes at the tertiary level are at the bottom of the hierarchy. High weight is assigned to the upper level classes and low weight is assigned to the lower level classes. Emotion of the textual data may then be recognized by calculating weights for a particular emotion by adding weights assigned at each level of the hierarchy as well as calculating the weight for its counter emotion. Both scores are compared and the greater one is taken as the detected emotion.

Furthermore, in one embodiment, analyzer 202 analyzes the text entered by the author in the message of the messaging application prior to the author actually sending the message to the intended recipient to determine a topic of the content of the text.

A "topic," as used herein, refers to a high-level concept that is the subject of the text entered by the author in the body of the message that is to be sent to the recipient. In one embodiment, analyzer 202 determines the topic of the text entered by the author in the body of the message using natural language processing. In one embodiment, such topics may be identified based on identifying keywords in the text. Such keywords are stored in a data structure, such as a table. Each keyword may be associated with a topic, which is also stored in such a data structure. Based on matching one or more keywords in the data structure to terms used in the entered text, one or more topics (e.g., database, traveling, swimming, integrated circuits) may be identified. Alternatively, such keywords themselves may be topics. As a result, by matching a keyword/topic stored in a data structure to a term used in the text entered by the author, the topic of the entered text may be identified. In one embodiment, such a data structure is populated by an expert. In one embodiment, such a data structure is stored in a storage device (e.g., memory, disk drive) of message context notifier 106.

In one embodiment, the topic of the text entered by the author may be determined using natural language processing by identifying the noun or the noun-verb pattern in the entered text using part-of-speech tagging. The topic of the entered text may then be inferred based on the noun or the noun-verb pattern in the entered text.

In one embodiment, part-of-speech tagging is accomplished using a rule-based (e.g., E. Brill's tagger) or a stochastic part-of-speech tagging algorithm (e.g., Hidden Markov Model (HMM)).

Examples of software tools utilized by analyzer 202 to determine a topic of the content of the text include, but not limited to, MonkeyLearn, Aylien, IBM Watson®, Thematic®, Google® Cloud NLP, Amazon Comprehend®, MeaningCloud, Lexalytics®, etc.

Furthermore, analyzer 202 is configured to identify a relationship between the participants (e.g., chat participants), such as between the author of the message currently being composed by the author and the intended recipient. It is noted that the intended recipient may have previously been the author and sender of a message to the user who is currently composing a message to the intended recipient. In other words, each user of computing device 101 may be an author or a recipient of a message based on whether the user is composing a message to be transmitted to another user or is the recipient of a message being composed by another user.

In one embodiment, analyzer 202 identifies the recipient of the message being composed by an author based on the recipient(s) displayed in the recipient list associated with the message. In another embodiment, analyzer 202 identifies the recipient of the message being composed by an author based on the contact selected or entered by the author (e.g., user of computing device 101A), such as via various input means (e.g., keyboard) of computing device 101.

In one embodiment, analyzer 202 identifies the author of the message based on the message information box which identifies the author of the message. In another embodiment, analyzer 202 identifies the author of the message based on identifying the user of computing device 101 (e.g., user of computing device 101A), where such a computing device 101 has received text to be entered in a message to be sent to another user (e.g., user of computing device 101B).

In one embodiment, analyzer 202 identifies the relationship between the author of the message and the intended recipient(s) based on analyzing prior communications (previous messages) between such users, such as during a chat session. Such communications may be analyzed via natural language processing to identify keywords that indicate relationships, such as "son," "daughter," "girlfriend," "friend," "wife," etc. In one embodiment, such keywords associated with relationships are stored in a data structure (e.g., table), where the data structure includes a listing of keywords, including pairs of keywords, and their relationship. For example, the terms "girlfriend" and "boyfriend" may be associated with the boyfriend/girlfriend relationship. In another example, the term "son" may be associated with the parent/child relationship. Other exemplary relationships include husband/wife, strangers, co-workers, friends, etc. As a result, analyzer 202 performs a look-up in such a data structure using natural language processing for keywords that match the text being entered by the author. In one embodiment, such a data structure is populated by an expert. In one embodiment, such a data structure is stored in a storage device (e.g., memory, disk unit) of message context notifier 106.

Examples of software tools utilized by analyzer 202 to identify a relationship between the author and the recipient(s) include, but not limited to, MonkeyLearn, Aylien, IBM Watson®, Thematic®, Google® Cloud NLP, Amazon Comprehend®, MeaningCloud, Lexalytics®, etc.

Additionally, analyzer 202 is configured to identify an event or situation occurring while the author is entering text in the body of the message. Examples of such events or situations include being at work, at home, driving, Friday afternoon, exercising, late in the evening, etc.

In one embodiment, such events or situations may be identified based on analyzing prior communications (previous messages) between such users, such as during a chat session. Such communications may be analyzed via natural language processing to identify keywords that indicate events or situations. In one embodiment, such keywords (e.g., exercising) are stored in a data structure (e.g., table), where the data structure includes a listing of keywords associated with events or situations. For example, the term "exercising" may be associated with the event or situation of "exercising." As a result, analyzer 202 performs a look-up in such a data structure using natural language processing for keywords that match the text being entered by the author. In one embodiment, such a data structure is populated by an expert. In one embodiment, such a data structure is stored in a storage device (e.g., memory, disk unit) of message context notifier 106.

Examples of software tools utilized by analyzer 202 to identify an event or situation in such a manner include, but not limited to, MonkeyLearn, Aylien, IBM Watson®, Thematic®, Google® Cloud NLP, Amazon Comprehend®, MeaningCloud, Lexalytics®, etc.

In one embodiment, analyzer 202 is configured to identify an event or situation occurring while the author is entering text in the body of the message based on accessing a publicly shared calendar of the author and/or the intended recipient(s) to identify an event or situation listed in the calendar that is occurring while the author is entering text in the body of the message. Examples of software tools utilized by analyzer 202 to identify an event or situation in such a manner include, but not limited to, Exchange Calendar, Google® Calendar, etc.

In one embodiment, analyzer 202 is configured to obtain biometric information about the author at the time of entering text in the body of the message, where such information may be utilized to assist in generating the typing feedback indicator. For example, in one embodiment, biometric information about the author may be obtained by analyzer 202 via a biometric data feed from a wearable device worn by the user of computing device 101, where in one embodiment, computing device 101 represents the wearable device worn by the user. In one embodiment, the biometric data feed includes physical, physiological or behavioral information about the author (e.g., blood pressure, heart rate, etc.), which may assist in determining the event or situation occurring while the author is entering text in the body of the message. For example, the author's calendar may indicate that the author is at a gym at the time of entering text in the body of the message. Based on the author's heart rate and blood pressure, it may be inferred that the author is currently exercising at the gym. Such information may be used to generate the typing feedback indicator discussed below, such as including terms and/or symbols related to exercising and a gym.

Furthermore, in one embodiment, analyzer 202 is configured to identify an input mechanism that the author is utilizing to enter text in the body of the message. Examples of such input mechanisms include, but not limited to, a keyboard used for typing, a mobile device used for thumb typing, copying/pasting text, a speech-to-text software tool used for converting speech to text to be entered in the body of the message, an automated chat bot that automatically responds and sends messages to users who communicate with the bot, etc.

In one embodiment, analyzer 202 identifies such input mechanisms based on analyzing metadata associated with the entered text which identifies a source of the text, such as text being entered by the author via the keyboard or via a thumb board on a mobile computing device.

Examples of software tools utilized by analyzer 202 to identify an input mechanism in such a manner include, but not limited to, Alation®, Collibra®, erwin®, IBM® InfoSphere®, Informatica®, etc.

In another embodiment, analyzer 202 identifies such input mechanisms based on analyzing the activity log of the author's computing device 101. An "activity log," as used herein, is a record of application usage. In this manner, analyzer 202 may identify any application (e.g., speech-to-text application, such as Converse Smartly, Microsoft® Dictate, etc.) that communicated with the messaging application (e.g., WhatsApp®) based on analyzing the activity log of the author's computing device 101. Based on such analysis, analyzer 202 may determine that such text was entered into the body of the message from an application, such as a speech-to-text application or a word processing tool, such as in the example of the author copying/pasting text into the body of the message being composed by the author. In a further example, based on such analysis, it may be discovered that an automated chat bot is communicating with the messaging application to enter text into the body of the message being composed by the author.

Examples of software tools utilized by analyzer 202 to identify an input mechanism in such a manner include, but not limited to, Sematext Logs, SolarWinds® Loggly®, Splunk®, Logentries, Sumo Logic®, Papertrail, etc.

Message context notifier 106 further includes typing feedback indicator generator 203 configured to generate a typing feedback indicator to reflect an indication of the content of the message to be sent to the recipient(s) based on the identifications made by analyzer 202 and the analyses performed by analyzer 202 discussed above. That is, typing feedback indicator generator 203 is configured to generate a typing feedback indicator to reflect an indication of the content of the message to be sent to the recipient(s) based on the identified relationship between the author and the recipient(s), the identified event or situation occurring while the author is entering text in the body of the message, the identified input mechanism the author is utilizing to enter text in the body of the message, the sentiment, the emotion and/or the topic of the content of the text entered in the body of the message.

As discussed above, a "typing feedback indicator," as used herein, refers to a notification that is sent to the intended recipient of a message currently being composed by a user (author). Such a notification may simply inform the intended recipient of a message (e.g., user of computing device 101B) that the user (author) (e.g., user of computing device 101A) is currently typing, such as a notification which states "user is typing." Alternatively, such a notification to the intended recipient of a message may provide context awareness of the message to be received by the intended recipient in the near future that is currently being composed by the user (author). Such context awareness enables the intended recipient to have context about what the incoming message will be about. In one embodiment, such a typing feedback indicator includes words and/or a symbol(s) (e.g., icon shape), which may vary both in size and color.

In one embodiment, typing feedback indicator generator 203 is configured to generate a typing feedback indicator to reflect an indication of the content of the message to be sent to the recipient(s) based on the identifications made by analyzer 202 and the analyses performed by analyzer 202 using a machine learning algorithm.

In one embodiment, typing feedback indicator generator 203 uses a machine learning algorithm (e.g., supervised learning) to build a mathematical model based on sample data consisting of the identifications made by analyzer 202 and the analyses performed by analyzer 202. Such a data set is referred to herein as the "training data," which is used by the machine learning algorithm to make predictions or decisions as to what constitutes the typing feedback indicator (e.g., which words and/or symbols). In one embodiment, the training data consists of typing feedback indicators based on the identifications made by analyzer 202 and the analyses performed by analyzer 202. The algorithm iteratively makes predictions on the training data as to what constitutes the typing feedback indicators. Examples of such supervised learning algorithms include nearest neighbor, Naïve Bayes, decision trees, linear regression, support vector machines and neural networks.

In one embodiment, the mathematical model (machine learning model) corresponds to a classification model trained to predict what constitutes the typing feedback indicators.

In one embodiment, typing feedback indicator generator 203 generates a typing feedback indicator to reflect an indication of the content of the message to be sent to the recipient(s) based on the identifications made by analyzer 202 and the analyses performed by analyzer 202 by identifying words and/or symbols (e.g., icon shapes), which may vary by color and size, of the typing feedback indicators associated with such identifications and analyses. In one embodiment, such words and/or symbols (e.g., icon shapes) of the typing feedback indicators are stored in data structures (e.g., tables) associated with various identifications and analyses. For example, the topic of "car accident" may correspond to the typing feedback indicator of "car accident" plus the symbol of exclamation marks in red color. In another example, the boyfriend/girlfriend relationship along with the emotion of love may correspond to the typing feedback indicator of the symbol of hearts. In a further example, the parent/child relationship along with the topic of a request for money may correspond to the typing feedback indicator of the phrase "money request" plus the symbol of tears with dollar signs.

In one embodiment, typing feedback indicator generator 203 utilizes natural language processing for matching such indications and analyses performed by analyzer 202 in the data structures discussed above to identify the typing feedback indicator. In one embodiment, such data structures are populated by an expert. In one embodiment, such data structures are stored in the storage device (e.g., memory, disk drive) of message context notifier 106.

The following discusses examples of typing feedback indicator generator 203 generating a typing feedback indicator based on the identifications made by analyzer 202 and the analyses performed by analyzer 202 using the embodiments discussed above.

For instance, analyzer 202 may detect a boyfriend/girlfriend relationship with the situation of the boyfriend being home and the girlfriend being at work along with the sentiment being positive and the emotion being love, and the topic of the content of the entered text being love. As a result, typing feedback indicator generator 203 may generate a typing feedback indicator with the symbol of hearts to be sent to the intended recipient to reflect the content of the message that will soon be sent to the recipient.

In another example, analyzer 202 may detect a husband/wife relationship with the situation of the husband being at work and the wife being at school along with the sentiment being negative and the emotion being frustration and annoyance, and the topic of the content of the entered text being the son's problems with homework. As a result, typing feedback indicator generator 203 may generate a typing feedback indicator with the text of "<son's name> homework" along with school and trouble symbols to be sent to the intended recipient to reflect the content of the message that will soon be sent to the recipient.

In a further example, analyzer 202 may detect a parent/child relationship with the situation of the parent being at work and the child being at home along with the sentiment being negative and the emotion being fear and panic, and the topic of the content of the entered text being car accident. As a result, typing feedback indicator generator 203 may generate a typing feedback indicator with the text of "car accident" along with the symbol of exclamation marks in red color to be sent to the intended recipient to reflect the content of the message that will soon be sent to the recipient.

In another example, analyzer 202 may detect a parent/child relationship with the situation of the parent being at home and the child being at a dormitory along with the sentiment being negative and the emotion being sadness and troubled, and the topic of the content of the entered text being a request for money. As a result, typing feedback indicator generator 203 may generate a typing feedback indicator with the text of "<child's name> money request" along with the symbol of tears with dollar signs to be sent to the intended recipient to reflect the content of the message that will soon be sent to the recipient.

Furthermore, typing feedback indicator generator 203 is configured to generate a confidence value indicating a likelihood that the generated typing feedback indicator correctly reflects the indication of the content of the message to be sent to the recipient(s).

In one embodiment, a confidence value or score, such as a number between 0 and 1, is outputted by the machine learning model which represents the likelihood that the output of the machine learning model is correct. In one embodiment, each prediction has a confidence score. In one embodiment, the lower the confidence score, the lower the confidence that the generated typing feedback indicator correctly reflects the indication of the content of the message to be sent to the recipient(s). Conversely, the higher the confidence score, the higher the confidence that the generated typing feedback indicator correctly reflects the indication of the content of the message to be sent to the recipient(s).

In one embodiment, such confidence values or scores are based on an average error rate as established by an expert based on the amount of input received from analyzer 202 or based on the amount of text analyzed by analyzer 202. For example, if analyzer 202 simply analyzed the text "see you" or "yes, I got it," then there is not enough text to analyze in order to accurately formulate the topic of the content of the text or the sentiment or emotion expressed in the text. As a result, such topics, sentiments or emotions formulated by analyzer 202, which are used to generate the typing feedback generator, would result in a typing feedback indicator with a confidence value that indicates a low confidence (i.e., a low confidence score) that the typing feedback indicator correctly reflects the indication of the content of the message to be sent to the recipient(s). In one embodiment, such a confidence value or score is based on past error rates as established by the expert when the mathematical model makes predictions based on such limited analyzed text.

In another example, if analyzer 202 only provides the emotion expressed in the text, then the mathematical model may generate a typing feedback indicator based on such an emotion with a low confidence score. In one embodiment, such a confidence score is based on past error rates as established by the expert when the mathematical model makes predictions based on such limited identifications made by analyzer 202.

In one embodiment, confidence values or scores provided by the mathematical model are generated based on confidence determination models which add confidence information to the predictive mathematical model. In one embodiment, the confidence model provides a confidence score based on the amount of input received from analyzer 202 or based on the amount of text analyzed by analyzer 202. In one embodiment, such confidence values or scores are previously established by an expert.

Exemplary software tools for creating such confidence determination models include, but not limited to, ThingWorx® Composer, PI system®, Mosaic® , etc.

Message context notifier 106 further includes typing feedback display mechanism 204 configured to display either the typing feedback indicator generated by typing feedback indicator generator 203 or the default typing feedback indicator on a computing device(s) 101 of the recipient(s), such as via the display of computing device(s) 101 of the recipient(s). For example, the typing feedback indicator generated by typing feedback indicator generator 203 may be displayed in a chat box on the display of computing device(s) 101 of the recipient(s).

In one embodiment, typing feedback display mechanism 204 displays the typing feedback indicator generated by typing feedback indicator generator 203 on a computing device(s) 101 of the recipient(s) to provide an indication as to the context of the message to be sent to the recipient(s) if the confidence value associated with the generated typing feedback indicator exceed a threshold value, which may be user-specified. For example, the typing feedback indicator may be displayed in a chat box on the display of computing device 101 of the recipient(s).

If, however, the confidence value associated with the generated typing feedback indicator does not exceed the threshold value, then typing feedback display mechanism 204 displays a default typing feedback indicator on a computing device(s) 101 of the recipient(s), such as via the display of computing device(s) 101 of the recipient(s). For example, the default typing feedback indicator may be displayed in a chat box on the display of computing device(s) 101 of the recipient(s). In one embodiment, the default typing feedback indicator may simply indicate that the "user is typing."

A further description of these and other functions is provided below in connection with the discussion of the method for dynamically providing a typing feedback indicator.

Prior to the discussion of the method for dynamically providing a typing feedback indicator, a description of the hardware configuration of message context notifier 106 (FIG. 1) is provided below in connection with FIG. 3.

Figure 3:
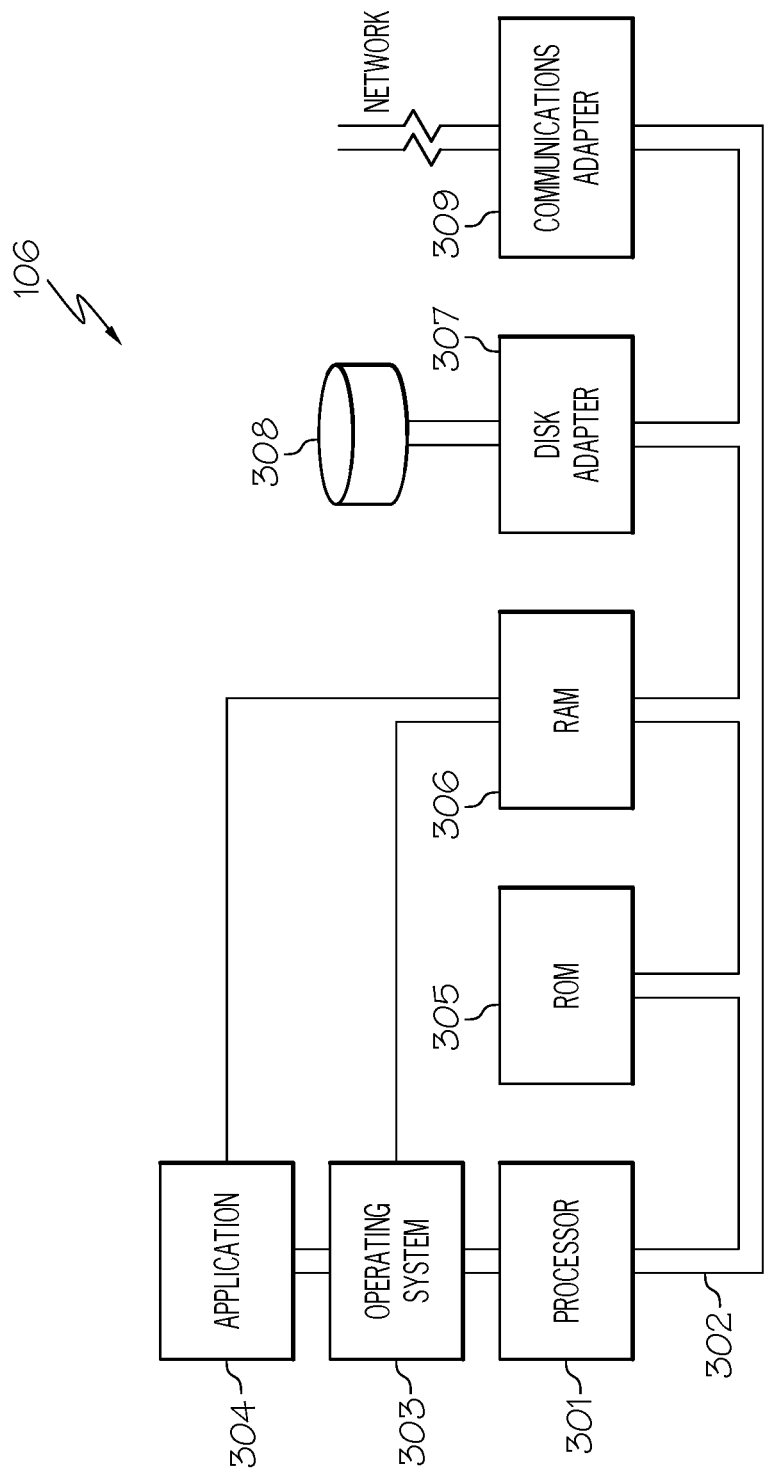
FIG. 3 illustrates an embodiment of the present disclosure of the hardware configuration of the message context notifier which is representative of a hardware environment for practicing the present disclosure.

Referring now to FIG. 3, FIG. 3 illustrates an embodiment of the present disclosure of the hardware configuration of message context notifier 106 (FIG. 1) which is representative of a hardware environment for practicing the present disclosure.

Message context notifier 106 has a processor 301 connected to various other components by system bus 302. An operating system 303 runs on processor 301 and provides control and coordinates the functions of the various components of FIG. 3. An application 304 in accordance with the principles of the present disclosure runs in conjunction with operating system 303 and provides calls to operating system 303 where the calls implement the various functions or services to be performed by application 304. Application 304 may include, for example, text input detector 201 (FIG. 2), analyzer 202 (FIG. 2), typing feedback indicator generator 203 (FIG. 2) and typing feedback display mechanism 204 (FIG. 2). Furthermore, application 304 may include, for example, a program for dynamically providing a typing feedback indicator as discussed further below in connection with FIGS. 4-6.

Referring again to FIG. 3, read-only memory ("ROM") 305 is connected to system bus 302 and includes a basic input/output system ("BIOS") that controls certain basic functions of message context notifier 106. Random access memory ("RAM") 306 and disk adapter 307 are also connected to system bus 302. It should be noted that software components including operating system 303 and application 304 may be loaded into RAM 306, which may be message context notifier's 106 main memory for execution. Disk adapter 307 may be an integrated drive electronics ("IDE") adapter that communicates with a disk unit 308, e.g., disk drive. It is noted that the program for dynamically providing a typing feedback indicator, as discussed further below in connection with FIGS. 4-6, may reside in disk unit 308 or in application 304.

Message context notifier 106 may further include a communications adapter 309 connected to bus 302. Communications adapter 309 interconnects bus 302 with an outside network (e.g., network 103 of FIG. 1) to communicate with other devices, such as computing devices 101 of FIG. 1.

In one embodiment, application 304 of message context notifier 106 includes the software components of text input detector 201, analyzer 202, typing feedback indicator generator 203 and typing feedback display mechanism 204. In one embodiment, such components may be implemented in hardware, where such hardware components would be connected to bus 302. The functions discussed above performed by such components are not generic computer functions. As a result, message context notifier 106 is a particular machine that is the result of implementing specific, non-generic computer functions.

In one embodiment, the functionality of such software components (e.g., text input detector 201, analyzer 202, typing feedback indicator generator 203 and typing feedback display mechanism 204) of message context notifier 106, including the functionality for dynamically providing a typing feedback indicator, may be embodied in an application specific integrated circuit.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated above, messaging applications (also referred to as instant messaging applications or chat applications) involve the use of instant messaging technology which is a type of online chat allowing real-time text transmission over the Internet or another computer network. Messages are typically transmitted between two or more parties, when each user inputs text and triggers a transmission to the recipient(s), who are all connected on a common network. It differs from email in that conversations over instant messaging happen in real-time (hence "instant"). Most modern messaging applications use push technology and also add other features, such as emojis (or graphical smileys), file transfer, chatbots, Voice over IP, or video chat capabilities. Another feature messaging applications may utilize is the typing feedback indicator. For example, when the user is typing a message, messaging applications may provide an indicator (referred to as the "typing feedback indicator") to the recipient(s) of the message which indicates that the user is typing a message. For instance, the recipient(s) may receive a typing feedback indicator that says "user is typing" after the user enters text in a message but prior to the user (author) actually sending the message to the recipient(s). As a result, the recipient(s) are provided some awareness that a message is coming or "in-flight." While providing recipient(s) an awareness that a message is coming is helpful, such recipient(s) do not have an indication as to what is the subject matter of the incoming message. That is, the recipient(s) do not have any awareness as to the context of the incoming message.

Figure 4:
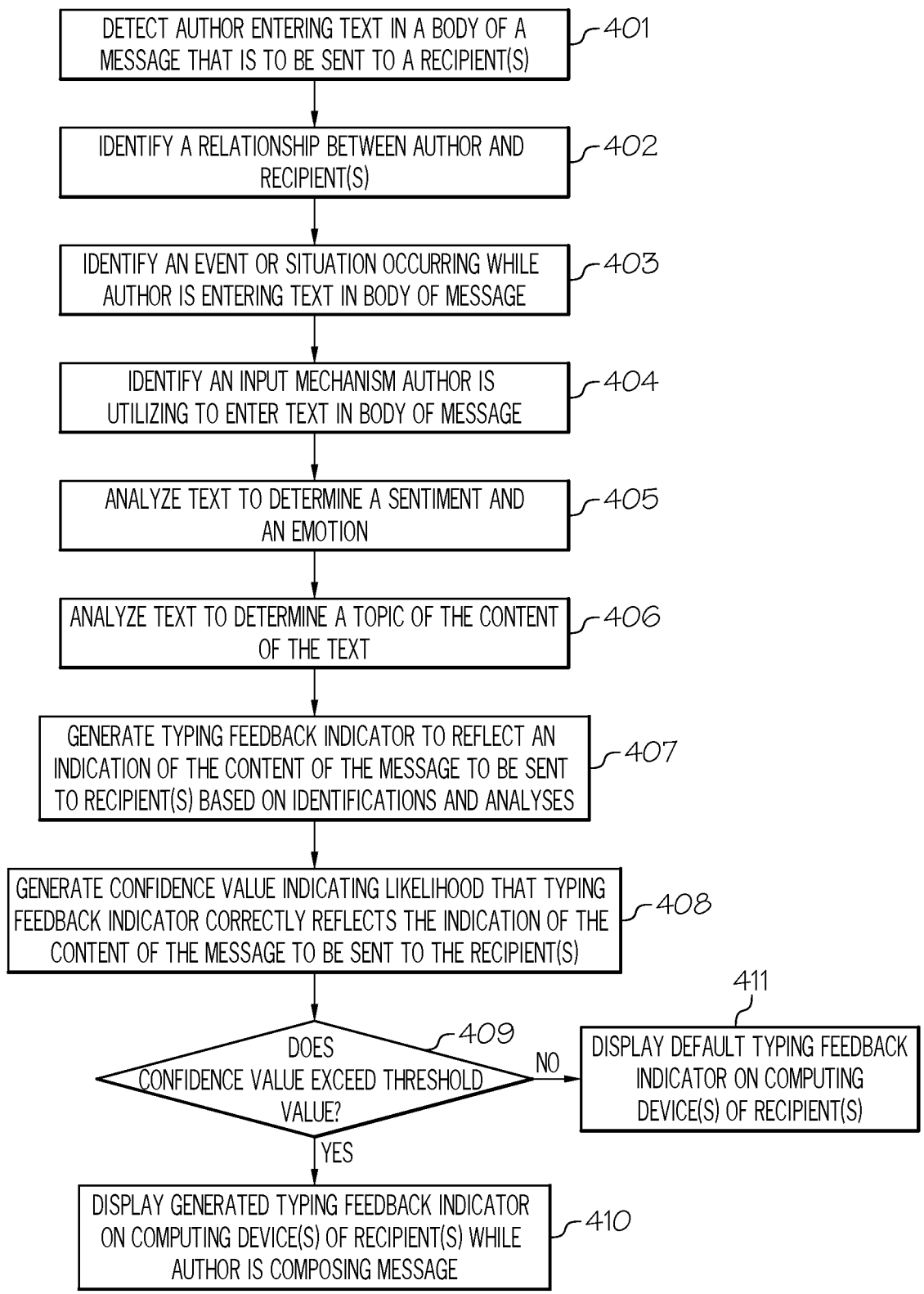
FIG. 4 is a flowchart of a method for dynamically providing a typing feedback indicator in accordance with an embodiment of the present disclosure.
Figure 5:
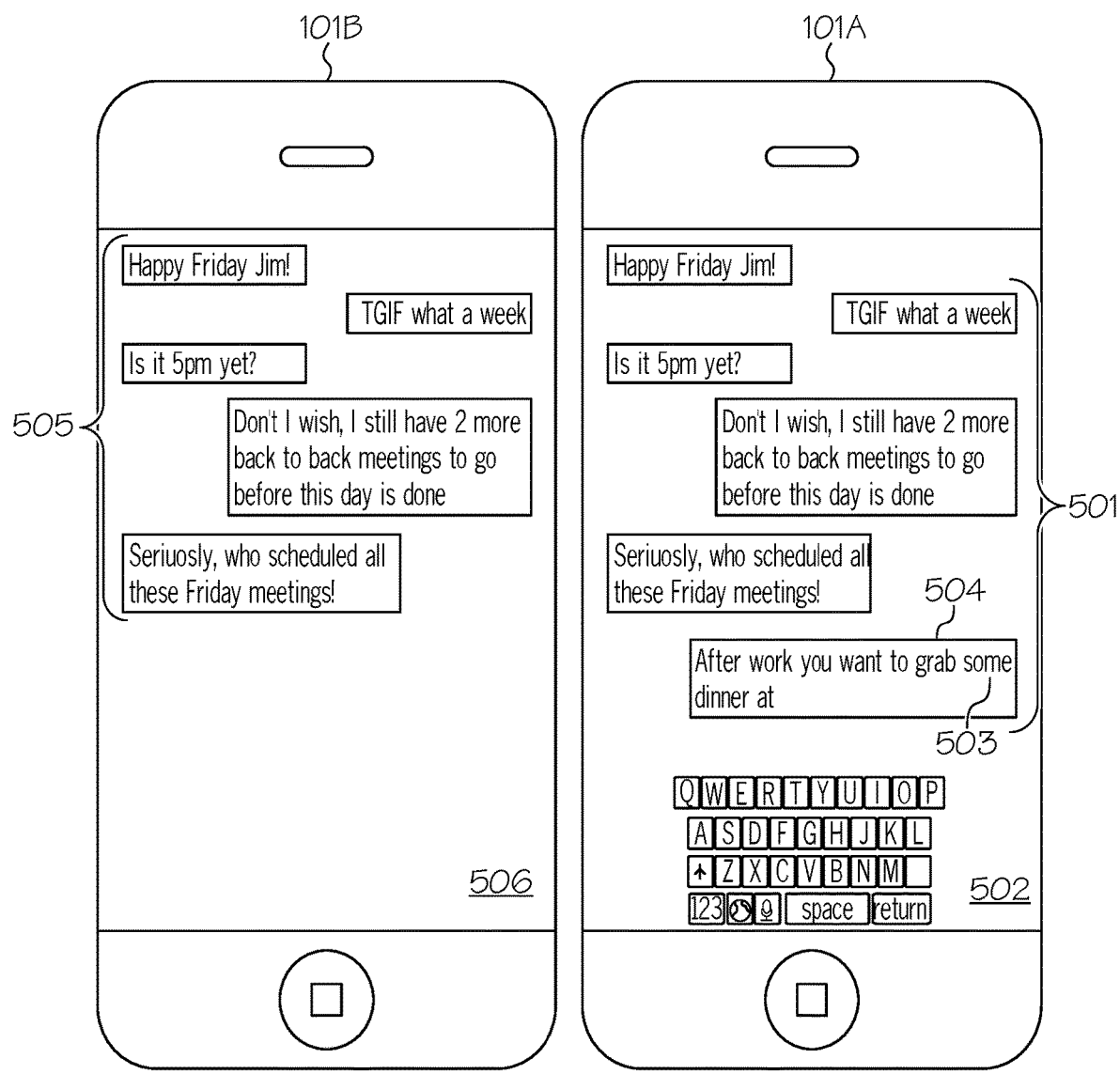
FIG. 5 illustrates an exemplary chat session between multiple users in accordance with an embodiment of the present disclosure.
Figure 6:
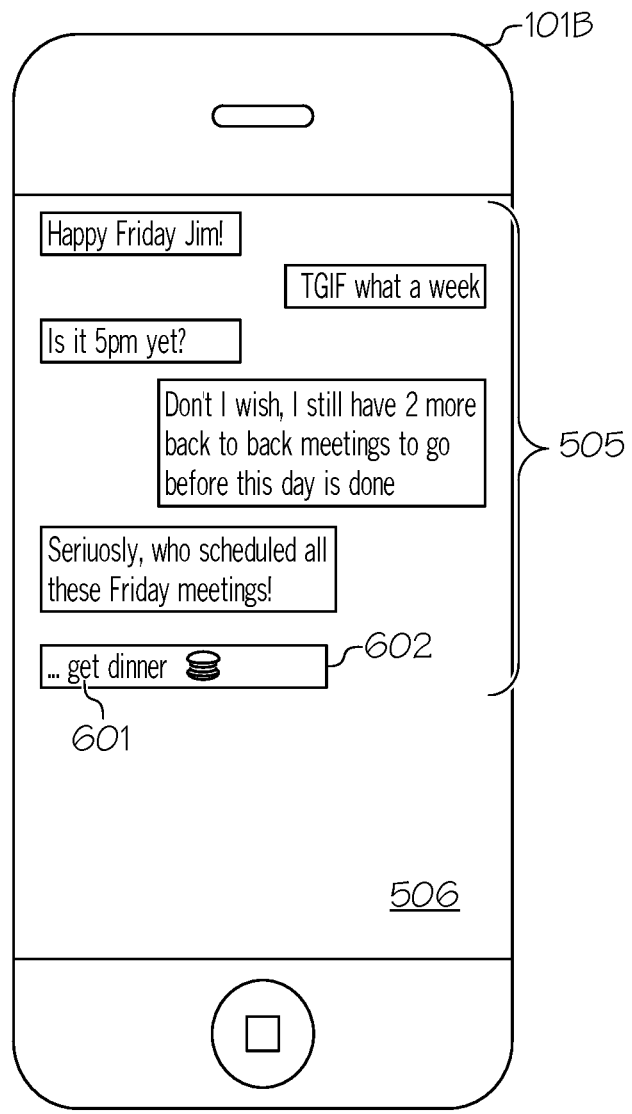
FIG. 6 illustrates a typing feedback indicator being displayed on a computing device of the recipient of a message being composed by the author, where the typing feedback indicator provides an indication as to the content of the message that will later be sent to the recipient in accordance with an embodiment of the present disclosure.

The embodiments of the present disclosure provide a means for generating a typing feedback indicator for the recipient to provide context awareness of the message to be received by the recipient in the near future that is currently being composed by the user (author) as discussed below in connection with FIGS. 4-6. FIG. 4 is a flowchart of a method for dynamically providing a typing feedback indicator. FIG. 5 illustrates an exemplary chat session between multiple users. FIG. 6 illustrates a typing feedback indicator being displayed on a computing device of the recipient of a message being composed by the author, where the typing feedback indicator provides an indication as to the content of the message that will later be sent to the recipient.

As stated above, FIG. 4 is a flowchart of a method 400 for dynamically providing a typing feedback indicator in accordance with an embodiment of the present disclosure.

Referring to FIG. 4, in conjunction with FIGS. 1-3, in step 401, text input detector 201 of message context notifier 106 detects the user (author) (e.g., user of computing device 101A) entering text in a body of a message that is to be sent to a recipient(s) (e.g., user of computing device 101B).

As discussed above, in one embodiment, text input detector 201 detects text being entered by a user (author) in a message of a messaging application (e.g., WhatsApp®), such as a message being composed in a chat box of a chat session (instant messaging session), by detecting a keypress event, such as when the user's cursor is located where the message is being composed. A "keypress event," as used herein, occurs when a key that produces a character value is pressed by the user (author, such as the user of computing device 101). Examples of keys that produce a character value include the alphabetic, numeric and punctuation keys. Alternatively, text input detector 201 detects text being entered by a user (author) in a message of a messaging application by detecting a keydown event, such as when the user's cursor is located where the message is being composed. A "keydown event," as used herein, occurs whenever any key is pressed by the user (author, such as the user of computing device 101) regardless as to whether the pressed key produces a character value.

Examples of software tools utilized by text input detector 201 to detect text being entered by a user in a message by detecting a keypress event or a keydown event include, but not limited to, BlackBox® Express, KidLogger, Iwantsoft Keylogger, Windows® Keylogger, REFOG Keylogger, Actual Keylogger, etc.

In one embodiment, text input detector 201 detects text being entered by a user (author) in a message of a messaging application based on detecting text appearing within a message box (field used to enter the text of the message) of the messaging application. In one embodiment, text input detector 201 assigns a method to the (change) attribute of the field (message box), where the attribute changes every time text is entered into the message box. Furthermore, in one embodiment, an event handler is assigned to the change attribute which may be programmed to provide a notification every time there is a change in the attribute (i.e., every time text is entered into the message box).

In step 402, analyzer 202 of message context notifier 106 identifies a relationship between the author and the recipient(s) prior to the message being sent to the recipient.

As discussed above, analyzer 202 is configured to identify a relationship between the participants (e.g., chat participants), such as between the author of the message currently being composed by the author and the intended recipient. It is noted that the intended recipient may have previously been the author and sender of a message to the user who is currently composing a message to the intended recipient. In other words, each user of computing device 101 may be an author or a recipient of a message based on whether the user is composing a message to be transmitted to another user or is the recipient of a message being composed by another user.

In one embodiment, analyzer 202 identifies the recipient of the message being composed by an author based on the recipient(s) displayed in the recipient list associated with the message. In another embodiment, analyzer 202 identifies the recipient of the message being composed by an author based on the contact selected or entered by the author (e.g., user of computing device 101A), such as via various input means (e.g., keyboard) of computing device 101.

In one embodiment, analyzer 202 identifies the author of the message based on the message information box which identifies the author of the message. In another embodiment, analyzer 202 identifies the author of the message based on identifying the user of computing device 101 (e.g., user of computing device 101A), where such a computing device 101 has received text to be entered in a message to be sent to another user (e.g., user of computing device 101B).

In one embodiment, analyzer 202 identifies the relationship between the author of the message and the intended recipient(s) based on analyzing prior communications (previous messages) between such users, such as during a chat session. Such communications may be analyzed via natural language processing to identify keywords that indicate relationships, such as "son," "daughter," "girlfriend," "friend," "wife," etc. In one embodiment, such keywords associated with relationships are stored in a data structure (e.g., table), where the data structure includes a listing of keywords, including pairs of keywords, and their relationship. For example, the terms "girlfriend" and "boyfriend" may be associated with the boyfriend/girlfriend relationship. In another example, the term "son" may be associated with the parent/child relationship. Other exemplary relationships include husband/wife, strangers, co-workers, friends, etc. As a result, analyzer 202 performs a look-up in such a data structure using natural language processing for keywords that match the text being entered by the author. In one embodiment, such a data structure is populated by an expert. In one embodiment, such a data structure is stored in a storage device (e.g., memory 305, disk unit 308) of message context notifier 106.

Examples of software tools utilized by analyzer 202 to identify a relationship between the author and the recipient(s) include, but not limited to, MonkeyLearn, Aylien, IBM Watson®, Thematic®, Google® Cloud NLP, Amazon Comprehend®, MeaningCloud, Lexalytics®, etc.

In step 403, analyzer 202 of message context notifier 106 identifies an event or situation occurring while the author is entering text in the body of the message prior to the message being sent to the recipient.

As stated above, examples of such events or situations include being at work, at home, driving, Friday afternoon, exercising, late in the evening, etc.

In one embodiment, such events or situations may be identified based on analyzing prior communications (previous messages) between such users, such as during a chat session. Such communications may be analyzed via natural language processing to identify keywords that indicate events or situations. In one embodiment, such keywords (e.g., exercising) are stored in a data structure (e.g., table), where the data structure includes a listing of keywords associated with events or situations. For example, the term "exercising" may be associated with the event or situation of "exercising." As a result, analyzer 202 performs a look-up in such a data structure using natural language processing for keywords that match the text being entered by the author. In one embodiment, such a data structure is populated by an expert. In one embodiment, such a data structure is stored in a storage device (e.g., memory 305, disk unit 308) of message context notifier 106.

Examples of software tools utilized by analyzer 202 to identify an event or situation in such a manner include, but not limited to, MonkeyLearn, Aylien, IBM Watson®, Thematic®, Google® Cloud NLP, Amazon Comprehend®, MeaningCloud, Lexalytics®, etc.

In one embodiment, analyzer 202 is configured to identify an event or situation occurring while the author is entering text in the body of the message based on accessing a publicly shared calendar of the author and/or the intended recipient(s) to identify an event or situation listed in the calendar that is occurring while the author is entering text in the body of the message. Examples of software tools utilized by analyzer 202 to identify an event or situation in such a manner include, but not limited to, Exchange Calendar, Google® Calendar, etc.

In one embodiment, analyzer 202 is configured to obtain biometric information about the author at the time of entering text in the body of the message, where such information may be utilized to assist in generating the typing feedback indicator. For example, in one embodiment, biometric information about the author may be obtained by analyzer 202 via a biometric data feed from a wearable device worn by the user of computing device 101, where in one embodiment, computing device 101 represents the wearable device worn by the user. In one embodiment, the biometric data feed includes physical, physiological or behavioral information about the author (e.g., blood pressure, heart rate, etc.), which may assist in determining the event or situation occurring while the author is entering text in the body of the message. For example, the author's calendar may indicate that the author is at a gym at the time of entering text in the body of the message. Based on the author's heart rate and blood pressure, it may be inferred that the author is currently exercising at the gym. Such information may be used to generate the typing feedback indicator discussed below, such as including terms and/or symbols related to exercising and a gym.

In step 404, analyzer 202 of message context notifier 106 identifies an input mechanism that the author is utilizing to enter text in the body of the message prior to the message being sent to the recipient.

As discussed above, in one embodiment, analyzer 202 is configured to identify an input mechanism that the author is utilizing to enter text in the body of the message. Examples of such input mechanisms include, but not limited to, keyboard used for typing, a mobile device used for thumb typing, copying/pasting text, a speech-to-text software tool used for converting speech to text to be entered in the body of the message, an automated chat bot that automatically responds and sends messages to users who communicate with the bot, etc.

In one embodiment, analyzer 202 identifies such input mechanisms based on analyzing metadata associated with the entered text which identifies a source of the text, such as text being entered by the author via the keyboard or via a thumb board on a mobile computing device.

Examples of software tools utilized by analyzer 202 to identify an input mechanism in such a manner include, but not limited to, Alation®, Collibra®, erwin®, IBM® InfoSphere®, Informatica®, etc.

In another embodiment, analyzer 202 identifies such input mechanisms based on analyzing the activity log of the author's computing device 101. An "activity log," as used herein, is a record of application usage. In this manner, analyzer 202 may identify any application (e.g., speech-to-text application, such as Converse Smartly, Microsoft® Dictate, etc.) that communicated with the messaging application (e.g., WhatsApp®) based on analyzing the activity log of the author's computing device 101. Based on such analysis, analyzer 202 may determine that such text was entered into the body of the message from an application, such as a speech-to-text application or a word processing tool, such as in the example of the author copying/pasting text into the body of the message being composed by the author. In a further example, based on such analysis, it may be discovered that an automated chat bot is communicating with the messaging application to enter text into the body of the message being composed by the author.

Examples of software tools utilized by analyzer 202 to identify an input mechanism in such a manner include, but not limited to, Sematext Logs, SolarWinds® Loggly®, Splunk®, Logentries, Sumo Logic®, Papertrail, etc.

In step 405, analyzer 202 of message context notifier 106 analyzes the text entered into the message by the user (author) prior to the message being sent to the recipient to determine a sentiment and an emotion.

As discussed above, a "sentiment," as used herein, refers to a view of or attitude toward a situation or event. An "emotion," as used herein, refers to an instinctive or intuitive feeling.

In one embodiment, analyzer 202 analyzes the text entered in the body of the message as it is being composed by the author to determine a sentiment using a sentiment analysis tool (e.g., TensiStrength to detect the strength of stress and relaxation expressed in the text) to determine the author's view of or attitude toward a situation or event. "Sentiment analysis," as used herein, refers to the process of computationally identifying and categorizing opinions expressed in a piece of text, especially in order to determine whether the writer's attitude is positive, negative, or neutral. For example, analyzer 202 may detect the author's positive, negative or neutral sentiment expressed in the message based on identifying keywords associated with positivity (e.g., "good," "happy"), negativity (e.g., "frustrated," "upset") or neutrality (e.g., "don't care"). In one embodiment, such keywords associated with positivity, negativity or neutrality are stored in a data structure (e.g., table), where the data structure includes a listing of keywords and their associated sentiment. As a result, analyzer 202 performs a look-up in such a data structure using natural language processing for terms that match the text being entered by the author. In one embodiment, such a data structure is populated by an expert. In one embodiment, such a data structure is stored in a storage device (e.g., memory 305, disk unit 308) of message context notifier 106.

In one embodiment, analyzer 202 analyzes the text to detect emotion terms using IBM® Watson Tone Analyzer. The emotion terms are categorized as anger, disgust, fear, joy and sadness.

In one embodiment, emotions may be recognized from the text entered by the author using the keyword spotting technique by analyzer 202. In such a technique, text is converted into tokens, and from these tokens, emotion words are identified and detected. Initially, this technique will take some text as input and in the next step tokenization is performed to the input text. Words related to emotions will be identified in the next step. Afterwards, analysis of the intensity of emotion words will be performed. An emotion class may then be found as the required output.

In another embodiment, emotions may be recognized by analyzer 202 from the text entered by the author using the lexical affinity method. In such a technique, it assigns a probability affinity for a particular emotion to arbitrary words apart from picking up emotional keywords.

In another embodiment, emotions may be recognized by analyzer 202 from the text entered by the author using learning-based methods. In such a technique, the problem is defined to classify the input texts into different emotions. Unlike keyword-based detection methods, learning-based methods try to detect emotions based on a previously trained classifier, which applies machine learning, such as support vector machines and conditional random fields, to determine which emotion category the input text should belong.

In one embodiment, emotions may be recognized by analyzer 202 from the text entered by the author using an ontology. For example, an emotion ontology may be utilized which includes a class and subclass relationship format. Emotion classes at the primary level in the hierarchy are at the top of the ontology and emotion classes at the tertiary level are at the bottom of the hierarchy. High weight is assigned to the upper level classes and low weight is assigned to the lower level classes. Emotion of the textual data may then be recognized by calculating weights for a particular emotion by adding weights assigned at each level of the hierarchy as well as calculating the weight for its counter emotion. Both scores are compared and the greater one is taken as the detected emotion.

In step 406, analyzer 202 of message context notifier 106 analyzes the text entered into the message by the user (author) prior to the message being sent to the recipient to determine a topic of the content of the text.

As stated above, a "topic," as used herein, refers to a high-level concept that is the subject of the text entered by the author in the body of the message that is to be sent to the recipient. In one embodiment, analyzer 202 determines the topic of the text entered by the author in the body of the message using natural language processing. In one embodiment, such topics may be identified based on identifying keywords in the text. Such keywords are stored in a data structure, such as a table. Each keyword may be associated with a topic, which is also stored in such a data structure. Based on matching one or more keywords in the data structure to terms used in the entered text, one or more topics (e.g., database, traveling, swimming, integrated circuits) may be identified. Alternatively, such keywords themselves may be topics. As a result, by matching a keyword/topic stored in a data structure to a term used in the text entered by the author, the topic of the entered text may be identified. In one embodiment, such a data structure is populated by an expert. In one embodiment, such a data structure is stored in a storage device (e.g., memory 305, disk drive 308) of message context notifier 106.

In one embodiment, the topic of the text entered by the author may be determined using natural language processing by identifying the noun or the noun-verb pattern in the entered text using part-of-speech tagging. The topic of the entered text may then be inferred based on the noun or the noun-verb pattern in the entered text.

In one embodiment, part-of-speech tagging is accomplished using a rule-based (e.g., E. Brill's tagger) or a stochastic part-of-speech tagging algorithm (e.g., Hidden Markov Model (HMM)).

Examples of software tools utilized by analyzer 202 to determine a topic of the content of the text include, but not limited to, MonkeyLearn, Aylien, IBM Watson®, Thematic®, Google® Cloud NLP, Amazon Comprehend®, MeaningCloud, Lexalytics®, etc.

In step 407, typing feedback indicator generator 203 of message context notifier 106 generates a typing feedback indicator to reflect an indication of the content of the message to be sent to the recipient(s) based on the identifications and the analyses discussed above. The typing feedback indicator generated by typing feedback indicator generator 203 includes words and/or a symbol(s) (e.g., icon shape), which may vary both in size and color.

As discussed above, in one embodiment, typing feedback indicator generator 203 is configured to generate a typing feedback indicator to reflect an indication of the content of the message to be sent to the recipient(s) based on the identifications made by analyzer 202 and the analyses performed by analyzer 202 discussed above. That is, typing feedback indicator generator 203 is configured to generate a typing feedback indicator to reflect an indication of the content of the message to be sent to the recipient(s) based on the identified relationship between the author and the recipient(s), the identified event or situation occurring while the author is entering text in the body of the message, the identified input mechanism the author is utilizing to enter text in the body of the message, the sentiment, the emotion and/or the topic of the content of the text entered in the body of the message.

As discussed above, a "typing feedback indicator," as used herein, refers to a notification that is sent to the intended recipient of a message currently being composed by a user (author). Such a notification may simply inform the intended recipient of a message (e.g., user of computing device 101B) that the user (author) (e.g., user of computing device 101A) is currently typing, such as a notification which states "user is typing." Alternatively, such a notification to the intended recipient of a message may provide context awareness of the message to be received by the intended recipient in the near future that is currently being composed by the user (author). Such context awareness enables the intended recipient to have context about what the incoming message will be about.

In one embodiment, typing feedback indicator generator 203 is configured to generate a typing feedback indicator to reflect an indication of the content of the message to be sent to the recipient(s) based on the identifications made by analyzer 202 and the analyses performed by analyzer 202 using a machine learning algorithm.

In one embodiment, typing feedback indicator generator 203 uses a machine learning algorithm (e.g., supervised learning) to build a mathematical model based on sample data consisting of the identifications made by analyzer 202 and the analyses performed by analyzer 202. Such a data set is referred to herein as the "training data," which is used by the machine learning algorithm to make predictions or decisions as to what constitutes the typing feedback indicator (e.g., which words and/or symbols). In one embodiment, the training data consists of typing feedback indicators based on the identifications made by analyzer 202 and the analyses performed by analyzer 202. The algorithm iteratively makes predictions on the training data as to what constitutes the typing feedback indicators. Examples of such supervised learning algorithms include nearest neighbor, Naïve Bayes, decision trees, linear regression, support vector machines and neural networks.

In one embodiment, the mathematical model (machine learning model) corresponds to a classification model trained to predict what constitutes the typing feedback indicators.

In one embodiment, typing feedback indicator generator 203 generates a typing feedback indicator to reflect an indication of the content of the message to be sent to the recipient(s) based on the identifications made by analyzer 202 and the analyses performed by analyzer 202 by identifying words and/or symbols (e.g., icon shapes), which may vary by color and size, of the typing feedback indicators associated with such identifications and analyses. In one embodiment, such words and/or symbols (e.g., icon shapes) of the typing feedback indicators are stored in data structures (e.g., tables) associated with various identifications and analyses. For example, the topic of "car accident" may correspond to the typing feedback indicator of "car accident" plus the symbol of exclamation marks in red color. In another example, the boyfriend/girlfriend relationship along with the emotion of love may correspond to the typing feedback indicator of the symbol of hearts. In a further example, the parent/child relationship along with the topic of a request for money may correspond to the typing feedback indicator of the phrase "money request" plus the symbol of tears with dollar signs.

In one embodiment, typing feedback indicator generator 203 utilizes natural language processing for matching such indications and analyses performed by analyzer 202 in the data structures discussed above to identify the typing feedback indicator. In one embodiment, such data structures are populated by an expert. In one embodiment, such data structures are stored in the storage device (e.g., memory 305, disk drive 308) of message context notifier 106.

In step 408, typing feedback indicator generator 203 of message context notifier 106 generates a confidence value indicating the likelihood that the typing feedback indicator generated by typing feedback indicator generator 203 in step 407 correctly reflects the indication of the content of the message to be sent to the recipient(s).

As stated above, in one embodiment, a confidence value or score, such as a number between 0 and 1, is outputted by the machine learning model which represents the likelihood that the output of the machine learning model is correct. In one embodiment, each prediction has a confidence score. In one embodiment, the lower the confidence score, the lower the confidence that the generated typing feedback indicator correctly reflects the indication of the content of the message to be sent to the recipient(s). Conversely, the higher the confidence score, the higher the confidence that the generated typing feedback indicator correctly reflects the indication of the content of the message to be sent to the recipient(s).

In one embodiment, such confidence values or scores are based on an average error rate as established by an expert based on the amount of input received from analyzer 202 or based on the amount of text analyzed by analyzer 202. For example, if analyzer 202 simply analyzed the text "see you" or "yes, I got it," then there is not enough text to analyze in order to accurately formulate the topic of the content of the text or the sentiment or emotion expressed in the text. As a result, such topics, sentiments or emotions formulated by analyzer 202, which are used to generate the typing feedback generator, would result in a typing feedback indicator with a confidence value that indicates a low confidence (i.e., a low confidence score) that the typing feedback indicator correctly reflects the indication of the content of the message to be sent to the recipient(s). In one embodiment, such a confidence value or score is based on past error rates as established by the expert when the mathematical model makes predictions based on such limited analyzed text.

In another example, if analyzer 202 only provides the emotion expressed in the text, then the mathematical model may generate a typing feedback indicator based on such an emotion with a low confidence score. In one embodiment, such a confidence score is based on past error rates as established by the expert when the mathematical model makes predictions based on such limited identifications made by analyzer 202.

In one embodiment, confidence values or scores provided by the mathematical model are generated based on confidence determination models which add confidence information to the predictive mathematical model. In one embodiment, the confidence model provides a confidence score based on the amount of input received from analyzer 202 or based on the amount of text analyzed by analyzer 202. In one embodiment, such confidence values or scores are previously established by an expert.

Exemplary software tools for creating such confidence determination models include, but not limited to, ThingWorx® Composer, PI system®, Mosaic®, etc.

In step 409, typing feedback display mechanism 204 of message context notifier 106 determines whether the confidence value (generated in step 408) exceeds a threshold value, which may be user-specified.

If the confidence value exceeds the threshold value, then, in step 410, typing feedback display mechanism 204 of message context notifier 106 displays the typing feedback indicator generated by typing feedback indicator generator 203 on a computing device(s) 101 of the recipient(s) while the user (author) is composing the message, such as via the display of computing device(s) 101 of the recipient(s). For example, the typing feedback indicator generated by typing feedback indicator generator 203 may be displayed in a chat box on the display of computing device 101 of the recipient(s) as illustrated in FIGS. 5 and 6.

FIG. 5 illustrates an exemplary chat session between multiple users in accordance with an embodiment of the present disclosure. FIG. 6 illustrates a typing feedback indicator being displayed on a computing device of the recipient of a message being composed by the author, where the typing feedback indicator provides an indication as to the content of the message that will later be sent to the recipient in accordance with an embodiment of the present disclosure.

Referring to FIG. 5, FIG. 5 illustrates a chat session 501 displayed on a display 502 of a computing device 101, such as computing device 101A, for the user (author) who is currently entering text 503 in the body of a message, such as in a chat box 504.

Furthermore, FIG. 5 illustrates a chat session 505 displayed on a display 506 of a computing device 101, such as computing device 101B, for the recipient of the message being composed by the author.

As shown in FIG. 5, the author is currently entering the text 503 of "After work you want to go grab some dinner at" in chat box 504. As discussed above, analyzer 202 analyzes such text to determine a sentiment and an emotion as well as a topic of the content of the text. Furthermore, as discussed above, analyzer 202 identifies the relationship between the chat users, identifies an event or situation occurring while the user is entering text 503 in the body of the message, such as in chat box 504, as well as identifies the input mechanism the user (author) is utilizing to enter text 503 in the body of the message, such as in chat box 504. Based on such identifications and analyses, typing feedback indicator generator 203 generates a typing feedback indicator to the recipient that provides the context awareness of the message to be received by the recipient in the near future that is currently being composed by the user (author).

For example, as shown in FIG. 6, typing feedback indicator generator 203 generates a typing feedback indicator 601 that includes the words "get dinner" and the symbol for food based on the indications and analyses performed by analyzer 202 with respect to the text 503 entered by the user (author). Furthermore, as shown in FIG. 6, typing feedback indicator 601 is displayed in a chat box 602 of chat session 505 that is displayed on a display 506 of computing device 101, such as computing device 101B.

Returning to FIG. 4, in conjunction with FIGS. 1-3 and 5-6, if, however, the confidence value does not exceed the threshold value, then, in step 411, typing feedback display mechanism 204 of message context notifier 106 displays a default typing feedback indicator on a computing device(s) 101 of the recipient(s), such as via the display of computing device(s) 101 of the recipient(s). For example, the default typing feedback indicator may be displayed in a chat box on the display of computing device(s) 101 of the recipient(s). In one embodiment, the default typing feedback indicator may simply indicate that the "user is typing."

In one embodiment, analyzer 202 continuously obtains the identifications discussed above and continuously analyzes the text entered in the body of the message by the author, including new text. As a result, the typing feedback indicator may be dynamically updated by typing feedback indicator generator 203.

In this manner, using the principles of the present disclosure, recipients of a message may receive a typing feedback indicator that includes context awareness of a message being composed by an author prior to receipt of such a message thereby providing such recipients an indication as to the context of the impending message.

Furthermore, the principles of the present disclosure improve the technology or technical field involving messaging applications.

As discussed above, messaging applications (also referred to as instant messaging applications or chat applications) involve the use of instant messaging technology which is a type of online chat allowing real-time text transmission over the Internet or another computer network. Messages are typically transmitted between two or more parties, when each user inputs text and triggers a transmission to the recipient(s), who are all connected on a common network. It differs from email in that conversations over instant messaging happen in real-time (hence "instant"). Most modern messaging applications use push technology and also add other features, such as emojis (or graphical smileys), file transfer, chatbots, Voice over IP, or video chat capabilities. Another feature messaging applications may utilize is the typing feedback indicator. For example, when the user is typing a message, messaging applications may provide an indicator (referred to as the "typing feedback indicator") to the recipient(s) of the message which indicates that the user is typing a message. For instance, the recipient(s) may receive a typing feedback indicator that says "user is typing" after the user enters text in a message but prior to the user (author) actually sending the message to the recipient(s). As a result, the recipient(s) are provided some awareness that a message is coming or "in-flight." While providing recipient(s) an awareness that a message is coming is helpful, such recipient(s) do not have an indication as to what is the subject matter of the incoming message. That is, the recipient(s) do not have any awareness as to the context of the incoming message.

Embodiments of the present disclosure improve such technology by detecting text entered in a body of a message that is to be sent to a recipient. For example, text being entered by a user (author) in a message of a messaging application (e.g., WhatsApp®) is detected, such as by detecting a keypress event. Prior to the user (author) sending the message to the recipient, the text of the message being composed by the user is analyzed to determine a sentiment and an emotion as well as to determine a topic of the content of the text. A "sentiment," as used herein, refers to a view of or attitude toward a situation or event. An "emotion," as used herein, refers to an instinctive or intuitive feeling. A "topic," as used herein, refers to a high-level concept that is the subject of the text entered by the author in the body of the message that is to be sent to the recipient. Based on such analyses, as well as possibly based on other criteria, such as based on the identified relationship between the author and the recipient(s), the identified event or situation occurring while the author is entering text in the body of the message, and the identified input mechanism the author is utilizing to enter text in the body of the message, a typing feedback indicator is generated to reflect an indication of the content of the message to be sent to the recipient. The typing feedback indicator includes words and/or a symbol(s) (e.g., icon shape), which may vary both in size and color. If the confidence that the typing feedback indicator correctly reflects the content of the message to be sent to the recipient(s), which may be reflected in a score, exceeds a threshold (e.g., threshold value), then the typing feedback indicator is displayed on a computing device of the recipient while the user (author) is composing the message. In this manner, recipients of a message may receive a typing feedback indicator that provides context awareness of a message being composed by an author prior to receipt of such a message. Furthermore, in this manner, there is an improvement in the technical field involving messaging applications.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for dynamically providing a typing feedback indicator, the method comprising:
    detecting a user entering text in a body of a message that is to be sent to a recipient;
    analyzing said text to determine a sentiment and an emotion;
    analyzing said text to determine a topic of content of said text;
    generating said typing feedback indicator to reflect an indication of content of said message to be sent to said recipient based on said topic of said content of said text, said sentiment and said emotion; and
    displaying said generated typing feedback indicator on a computing device of said recipient while said user is composing said message.

2. The method as recited in claim 1 further comprising:
    identifying a relationship between said user and said recipient;
    identifying an event or situation occurring while said user is entering text in said body of said message;
    identifying an input mechanism said user is utilizing to enter said text in said body of said message; and
    generating said typing feedback indicator to reflect said indication of said content of said message to be sent to said recipient based on said topic of said content of said text, said sentiment, said emotion, said identified relationship, said identified event or situation and said identified input mechanism.

3. The method as recited in claim 1, wherein said typing feedback indicator comprises one or more of the following: one or more words and one or more symbols.

4. The method as recited in claim 1 further comprising:
generating a confidence value indicating a likelihood that said generated typing feedback indicator correctly reflects said indication of said content of said message to be sent to said recipient.

5. The method as recited in claim 4 further comprising:
displaying said generated typing feedback indicator on said computing device of said recipient in response to said confidence value exceeding a threshold value; and
displaying a default typing feedback indicator on said computing device of said recipient in response to said confidence value not exceeding said threshold value.

6. The method as recited in claim 1, wherein said typing feedback indicator is dynamically updated as said user enters new text in said body of said message.

7. The method as recited in claim 1, wherein said message is a message being typed in a messaging application.

8. A computer program product for dynamically providing a typing feedback indicator, the computer program product comprising one or more computer readable storage mediums having program code embodied therewith, the program code comprising programming instructions for:
detecting a user entering text in a body of a message that is to be sent to a recipient;
analyzing said text to determine a sentiment and an emotion;
analyzing said text to determine a topic of content of said text;
generating said typing feedback indicator to reflect an indication of content of said message to be sent to said recipient based on said topic of said content of said text, said sentiment and said emotion; and
displaying said generated typing feedback indicator on a computing device of said recipient while said user is composing said message.

9. The computer program product as recited in claim 8, wherein the program code further comprises the programming instructions for:
identifying a relationship between said user and said recipient;
identifying an event or situation occurring while said user is entering text in said body of said message;
identifying an input mechanism said user is utilizing to enter said text in said body of said message; and
generating said typing feedback indicator to reflect said indication of said content of said message to be sent to said recipient based on said topic of said content of said text, said sentiment, said emotion, said identified relationship, said identified event or situation and said identified input mechanism.

10. The computer program product as recited in claim 8, wherein said typing feedback indicator comprises one or more of the following: one or more words and one or more symbols.

11. The computer program product as recited in claim 8, wherein the program code further comprises the programming instructions for:
generating a confidence value indicating a likelihood that said generated typing feedback indicator correctly reflects said indication of said content of said message to be sent to said recipient.

12. The computer program product as recited in claim 11, wherein the program code further comprises the programming instructions for:
displaying said generated typing feedback indicator on said computing device of said recipient in response to said confidence value exceeding a threshold value; and
displaying a default typing feedback indicator on said computing device of said recipient in response to said confidence value not exceeding said threshold value.

13. The computer program product as recited in claim 8, wherein said typing feedback indicator is dynamically updated as said user enters new text in said body of said message.

14. The computer program product as recited in claim 8, wherein said message is a message being typed in a messaging application.

15. A system, comprising:
a memory for storing a computer program for dynamically providing a typing feedback indicator; and
a processor connected to said memory, wherein said processor is configured to execute program instructions of the computer program comprising:
detecting a user entering text in a body of a message that is to be sent to a recipient;
analyzing said text to determine a sentiment and an emotion;
analyzing said text to determine a topic of content of said text;
generating said typing feedback indicator to reflect an indication of content of said message to be sent to said recipient based on said topic of said content of said text, said sentiment and said emotion; and
displaying said generated typing feedback indicator on a computing device of said recipient while said user is composing said message.

16. The system as recited in claim 15, wherein the program instructions of the computer program further comprise:
identifying a relationship between said user and said recipient;
identifying an event or situation occurring while said user is entering text in said body of said message;
identifying an input mechanism said user is utilizing to enter said text in said body of said message; and
generating said typing feedback indicator to reflect said indication of said content of said message to be sent to said recipient based on said topic of said content of said text, said sentiment, said emotion, said identified relationship, said identified event or situation and said identified input mechanism.

17. The system as recited in claim 15, wherein said typing feedback indicator comprises one or more of the following: one or more words and one or more symbols.

18. The system as recited in claim 15, wherein the program instructions of the computer program further comprise:
generating a confidence value indicating a likelihood that said generated typing feedback indicator correctly reflects said indication of said content of said message to be sent to said recipient.

19. The system as recited in claim 18, wherein the program instructions of the computer program further comprise:
displaying said generated typing feedback indicator on said computing device of said recipient in response to said confidence value exceeding a threshold value; and
displaying a default typing feedback indicator on said computing device of said recipient in response to said confidence value not exceeding said threshold value.

20. The system as recited in claim 15, wherein said typing feedback indicator is dynamically updated as said user enters new text in said body of said message.

* * * * *